United States Patent [19]
Nimberger

[11] Patent Number: 5,257,653
[45] Date of Patent: Nov. 2, 1993

[54] EJECTOR PULL AWAY SYSTEM AND APPARATUS

[75] Inventor: Spencer M. Nimberger, Houston, Tex.

[73] Assignee: Precision General Inc., Houston, Tex.

[21] Appl. No.: 788,185

[22] Filed: Nov. 5, 1991

[51] Int. Cl.$^5$ ............................................. F16L 37/28
[52] U.S. Cl. ..................................... 141/346; 141/382; 141/383; 141/387; 137/614.04; 137/498; 285/402
[58] Field of Search ............... 141/346, 370, 372, 373, 141/384, 386, 387, 383, 382, 368, 194, 98, 18, 2; 137/614.04, 614.06, 637.05, 637.5, 498, 614; 251/16, 89.5, 128, 340, 95, 98–100; 285/402, 401, 396, 376, 361, 360, 290

[56] References Cited

U.S. PATENT DOCUMENTS

| | | | |
|---|---|---|---|
| 2,821,209 | 1/1958 | Waterman | 251/16 |
| 2,896,977 | 7/1959 | Hansen | 137/614.04 |
| 2,972,491 | 2/1961 | Dutton | 251/89.5 |
| 3,625,251 | 12/1971 | Nelson | 137/614.04 |
| 3,874,428 | 4/1975 | Golay | 141/95 |
| 4,230,161 | 10/1980 | Billington et al. | 141/302 |
| 4,269,215 | 5/1981 | Odar | 137/75 |
| 4,310,012 | 1/1982 | Billington et al. | 137/75 |
| 4,354,522 | 10/1982 | Bormioli | 137/614.02 |
| 4,723,929 | 2/1988 | Parish | 441/39 |
| 4,763,683 | 8/1988 | Carmack | 137/614.04 |
| 4,791,961 | 12/1988 | Nitzberg et al. | 137/614.04 |
| 4,800,913 | 1/1989 | Nitzberg et al. | 137/614.04 |
| 4,896,688 | 1/1990 | Richards et al. | 137/614.04 |
| 4,899,792 | 2/1990 | Podgers | 141/382 |
| 4,998,560 | 5/1991 | Le Devehat | 137/616 |
| 5,009,252 | 4/1991 | Faughn | 137/614.04 |
| 5,018,546 | 5/1991 | Carmack et al. | 137/614.04 |
| 5,115,836 | 5/1992 | Carow et al. | 137/614.04 |

OTHER PUBLICATIONS

Continental NH3, Pull Away Safety Systems, Date Unknown but prior, 4 pages, United States.
Rego, Pull Away Valves for Transfer Operations, Date Unknown but prior, 1 page, United States.

Primary Examiner—Ernest G. Cusick
Attorney, Agent, or Firm—John R. Kirk, Jr.

[57] ABSTRACT

The invention is directed to a safety release disconnection for a fluid conduit. The connection includes a pin and a U-shaped slot with an ejector spring adjustably biased by a loading nut. Check valves are provided in both connection elements and are opened by contact or interfacing of the valves. A rigid moment arm points in a direction perpendicular to the direction that a vehicle pulls away from the filling stand. A pull away while the system is connected to the vehicle will trigger the safety release disconnection.

8 Claims, 6 Drawing Sheets

EJECTOR PULL AWAY SYSTEM AND APPARATUS

BACKGROUND OF THE INVENTION

This invention relates generally to an EJECTOR pull away system and more particularly relates to a detent or latch type non-breakaway connection used in fluid or gas filling stands such as for instance an anhydrous ammonia or a propane filling stand.

Anhydrous ammonia, $NH_3$, is primarily used as a fertilizer by farmers. A farmer will normally fill a tank with anhydrous ammonia and pull such tank behind a tractor for distributing anhydrous ammonia to various injector devices thereby injecting the fertilizer into the soil.

Anhydrous ammonia is highly toxic and therefore is a very dangerous substance. If not contained and allowed to vaporize it can do much harm as it drifts through the immediate area. This is especially true during a temperature inversion when the vapor is held close to the ground.

Typical farming communities have co-ops with huge tanks of anhydrous ammonia. A filling stand will be located on the co-op premises for distributing the anhydrous ammonia to farmers. Farmers typically all rush in around the same time to obtain a supply of anhydrous ammonia since farming (and more specifically the proper time for fertilizing) is seasonal. Thus, there is a certain time of year when non-stop use of the filling stand can occur. In haste a farmer may try to pull away from the filling stand without disconnecting the line which can lead to a failure anywhere in the flow delivery system including the main storage tank.

PRIOR ART

Prior safety devices have been devised for use in handling anhydrous ammonia. The old approach was the use of a bulkhead having a huge U frame that delivery and exit pipes would run around on the way to and from the farmer's tank. This would hopefully cause the pipe but not the main storage tank to break during a pull away. Another system was the use of a flow valve which would shut during excess flow to stop a leak caused during a break.

Since anhydrous ammonia is toxic and can result in death more reliable systems were needed. In 1989, the American National Standards ANSI K 61-1 and Compressed Gas Association CGA-G2.1 approved a new safety standard, K 61-1-5.10.8.1. This standard basically required all stationary storage installations to have an emergency shut-off valve within five feet of where the hose or swivel piping is attached, so mounted that any break will occur on the hose side of the valve. One type of anhydrous ammonia pull away system designed to meet this standard utilized a shear fitting with a preengineered break point. During a pull away the fitting would hopefully break at the shear point and valves located within the line would close off when triggered by lines pulled during the breakaway. Such a system would then need to be repaired by replacing the shear fitting and reconnecting the safety cable. Problems can arise if the line does not break at the preengineered stress point during a pull away or if hoses get "hung up" during a pull away. This system is also very expensive in that it can require that the existing stand be stripped to the ground to install the new system. The need therefore existed for an anhydrous ammonia filling stand safety device which was inexpensive and easy to retrofit to existing fill stations.

Another prior safety release system utilizes two interfacing check valves. One of the check valves is contained within a ball type connection piece and the other check valve is contained within a detent connection type piece. Together these pieces comprise an air chuck type connection. This system fails to recognize that the direction of a pull away effects the forces placed upon the coupling and therefore fails to consider the possibility for interference between the connection pieces. This system also fails to allow adjustability in the force required to uncouple the pieces.

Other non-anhydrous ammonia fluid disconnectors have been disclosed. An example of such a disconnector is disclosed in U.S. Pat. No. 4,899,792 to Podgers. These tension release disconnectors are swivel-type coupling designed for gas station or other similar pull aways. The prior non-anhydrous ammonia systems have several shortcomings. First, they fail to recognize that the direction of a pull away effects the forces placed upon the coupling. Without considering this problem a pull away in a direction not considered may get "hung up" due to interference between the parts. Secondly, they fail to comprehend a system allowing adjustment of the force required to uncouple the parts. Third, they fail to take into account jostling of the connection which is not attributable to a pull away and which therefore should not cause the connection to pull apart. Lastly, these non-anhydrous ammonia systems fail to consider the importance of instantaneous closing of valves once the connection has been broken.

SUMMARY OF THE INVENTION

The present invention addresses and resolves several problems not recognized by the prior art and is structurally distinct for purposes of resolving these problems. The apparatus does not require repair or replacement parts. The present invention considers that a pull away occurs in a limited number of directions and causes the system to shut down whenever a pull away occurs in any one of these directions. For instance, the filling stand is constructed on a flat surface and therefore a vehicle pulling away from the filling stand will exert a force which lies in a horizontal plane. Additionally, the pull away must occur in this horizontal plane in a direction away from a connection point and the direction of such a pull away can be controlled by controlling the direction that a driver can pull away from the filling stand. Each installation can be custom designed to further limit the possible pull away directions. The uncoupling is further controlled by requiring a disconnection upon the application of a threshold rotational shear force or torsion to be applied around the connection point. The present invention also includes structure allowing an instantaneous closing of the flow lines by system pressure ejection or a spring assisted ejection during a pull away. The connection is structured such that the threshold torsion can be applied without pulling apart the connection if the torsion is attributable to bumping or jostling. The connection is also constructed so that when a disconnection is desired, such disconnection will be made without the parts interfering or becoming "hung up" on each other.

As described below the invention is designed for handling $NH_3$. However the invention can be used with any media. The system is designed to be gastight meaning it will not leak the fluid handled under operating pressures.

The invention is directed to a safety release disconnection by ejection for a fluid conduit. The connection includes a pin and a U-shaped slot with an ejector spring adjustably biased by a loading nut. Check valves are provided in both connection elements and are opened by a contact or interfacing of the valves. A rigid moment arm points in a direction perpendicular to the direction that a vehicle pulls away from the filling stand. A pull away while the system is connected to the vehicle will trigger the safety release disconnection.

THE DETAILED DESCRIPTION OF THE INVENTION

Figure 1:
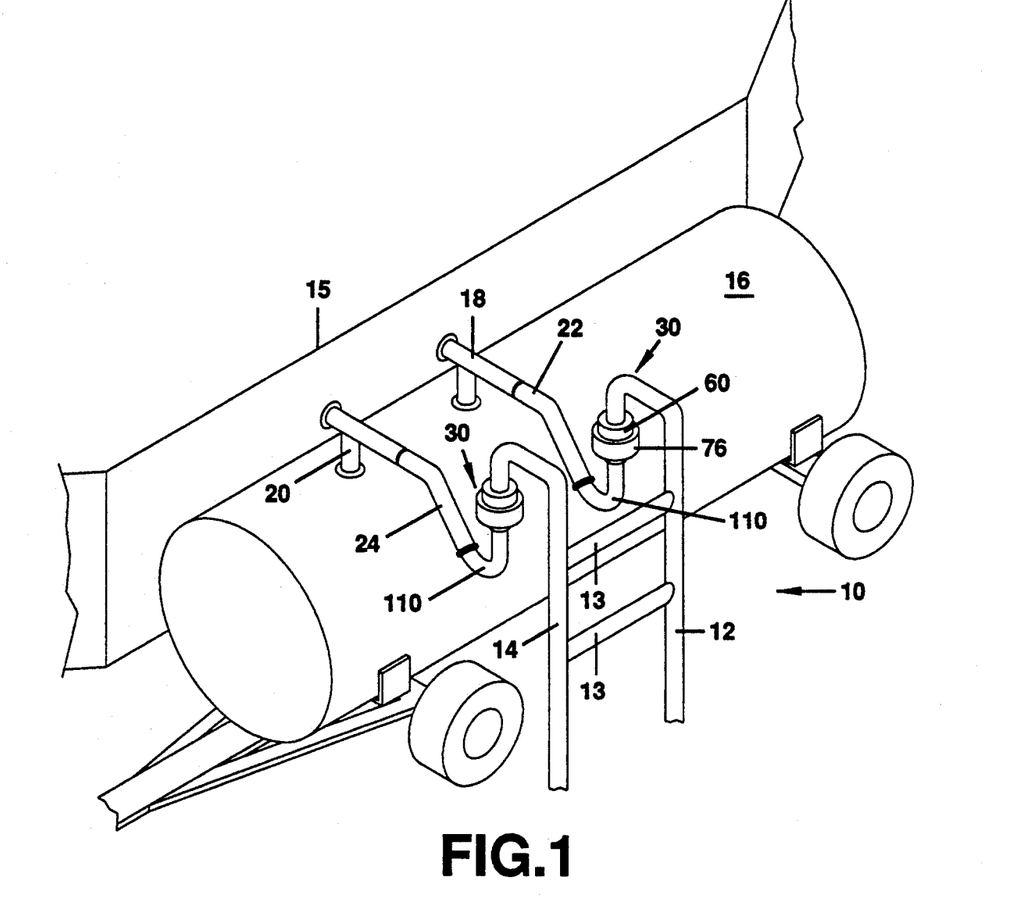
FIG. 1 is a perspective view of an $NH_3$ filling stand utilizing the invention disclosed herein.

FIG. 1 illustrates a typical filling stand 10 with both a liquid inlet line 12 and a vapor return outlet line 14. The invention can be used with any liquid or gas media but will be discussed below with respect to anhydrous ammonia ($NH_3$). Cross bars 13 add rigidity to lines 12 and 14 which as shown are rigid pipes to prevent twisting of stand 10. The rigidity or bracing of filling stand 10 initiates control over the force required to disconnect the system in the event of a pull away. When an anhydrous ammonia tank 16 is parked at the filling stand 10 inlet and outlet nozzles 18 and 20 are attached to the tank 16. Inlet and outlet hoses 22 and 24 are connected to the inlet and outlet lines 12 and 14 by the ejector pull away invention described below.

Figure 2:
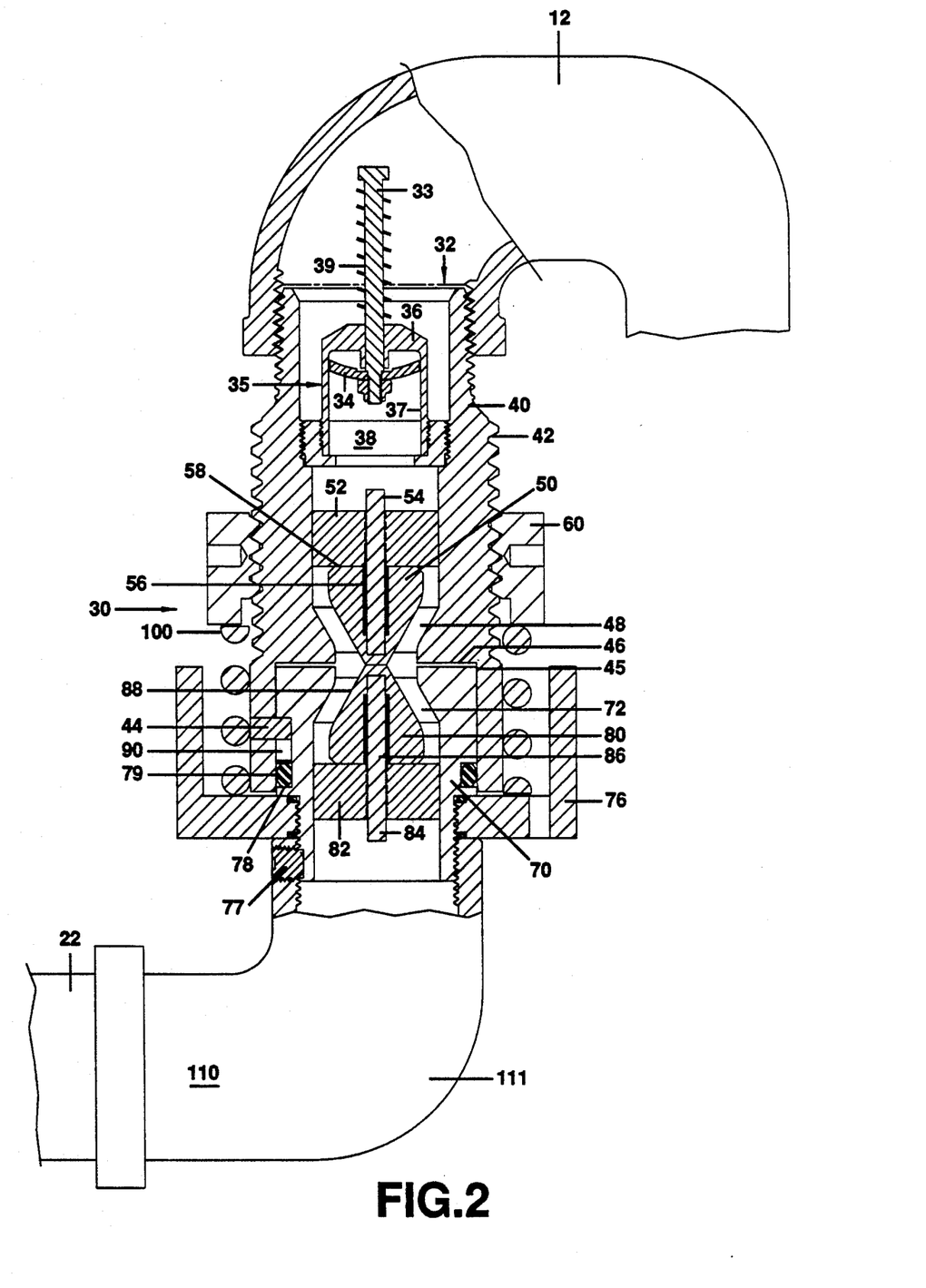
FIG. 2 is a cross-sectional, elevational view of the invention in a connected and open position.
Figure 3:
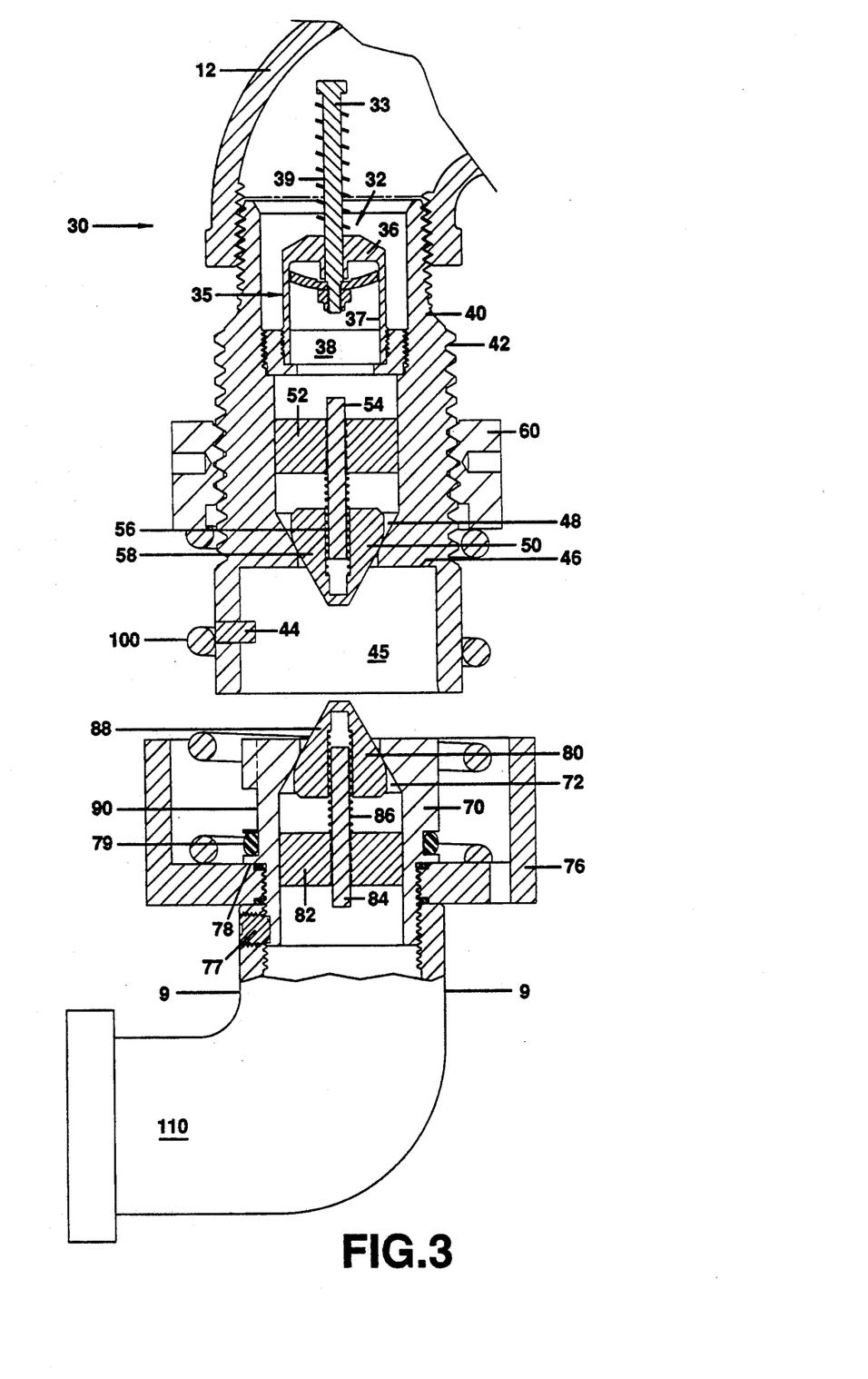
FIG. 3 is a view similar to FIG. 2 shown in a closed, ejecting position.

Referring to FIGS. 2 and 3 the in flow delivery line 12 (which is identical to out flowing line 14) is connected to a conduit 40. An excess flow valve 32 is attached and mounted within the upper end of conduit 40. A back check valve 50 is mounted and attached within the lower end of conduit 40. Conduit 40 includes external threading 42. An internally threaded spring loading nut 60 is adapted to be threaded over conduit 40 to compress the spring after manual connection. The lower end of conduit 40 includes a cylindrical bore 45 which terminates at a shoulder 46. Radially intending pin 44 is fixed to conduit 40 within bore 45. The inner surface of conduit 40 defines a conical bore 48 or valve seat within conduit 40 fitted to match and seal with back check valve 50.

Figure 9:
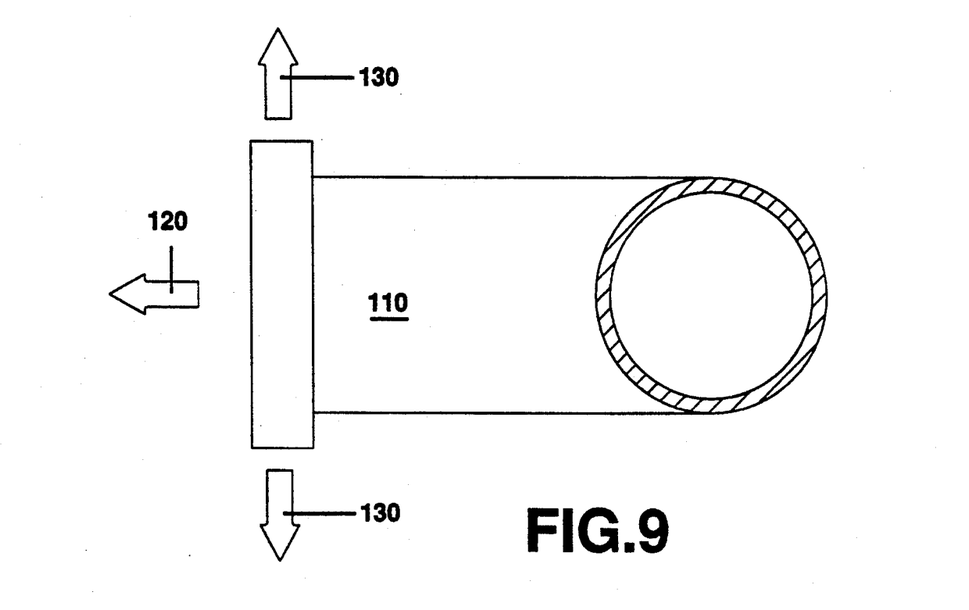
FIG. 9 is a cross-sectional view taken along line 9—9 of FIG. 3.

The out flowing line includes moment arm 110 (shown also in FIG. 9) and collar protector 76 fixed to collar 70. Moment arm 110 has a bend 111 so that the axis of the moment arm is not collinear with the axis of connection 30. Anti-rotation lock 77 prevents rotation and unfixing of those parts. Back check 80 is mounted within collar 70. The inner surface of collar 70 defines a conically shaped bore or valve seat 72 fitted to match and seal with back check valve 80. Collar protector 76 is attached around collar 70. The exterior of collar 70 includes a slot 90 as described in more detail below. An annular groove 78 also runs around the exterior of collar 70 for containing O-ring 79. Ejector spring 100 has an inner diameter which is greater than the outer diameter of conduit 40. The force of spring 100 prevents connection from being made without backing off loading nut 60 prior to making such connection. Additionally, the force of spring 100 provides additional drag to prevent an ejection from being triggered by an operator "whipping" the hose 22. A pull away is required for ejection.

Figure 8:
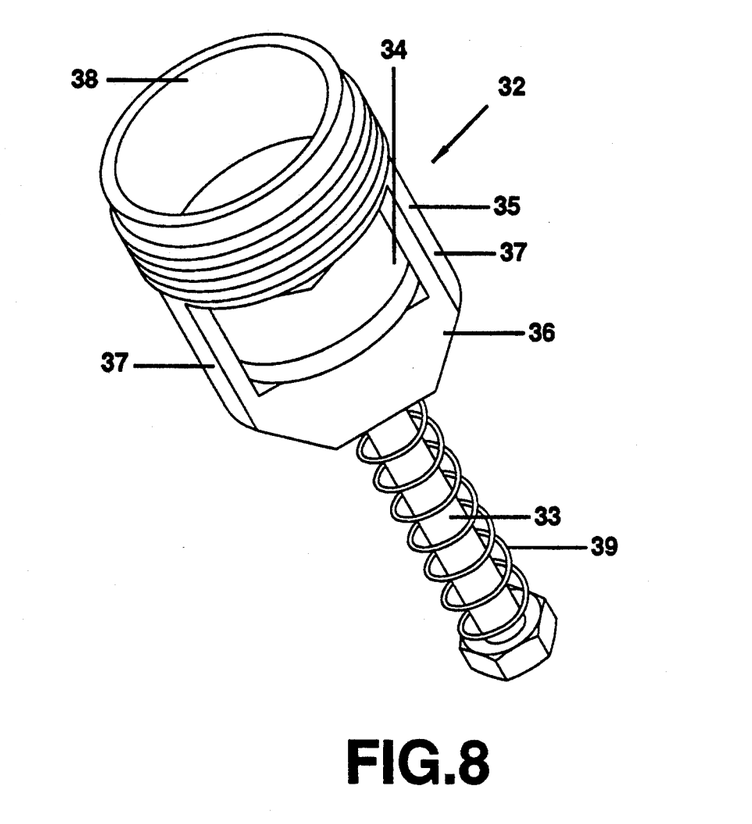
FIG. 8 is a perspective view of the excess flow valve.

Referring to FIGS. 2 and 8 excess flow valve 32 generally includes stem 33 attached to disc 34 which slides within body 35. Body 35 includes base 36, two ribs 37 and annular neck 38. Two open regions in body 35 are defined or bounded by base 36, ribs 37 and annular neck 38. As shown in FIG. 2 excess flow valve 32 is normally held in an open position by spring 39.

Figure 4:
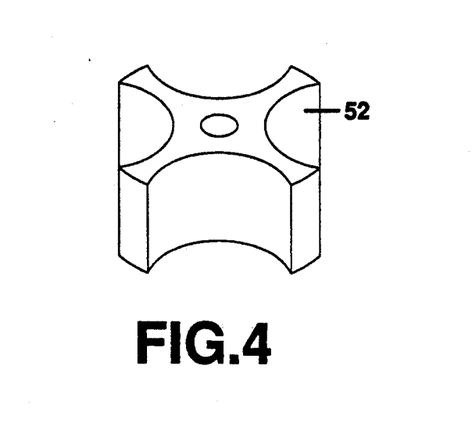
FIG. 4 is a perspective view of a portion of the check valve.

Back check valves 50 and 80, respectively, include identical bases 52 and 82 (FIG. 4), stems 54 and 84, springs 56 and 86 and conical poppets 58 and 88. Conical poppets 58 and 88 are preferably made of TEFLON to make the seal gastight under system pressures. Back check valves 50 and 80 are biased to a closed position by springs 56 and 86. Base 52 and 82 is cross shaped (FIG. 4) in order to allow the passage of media therethrough.

Figures 5, 6, 7:
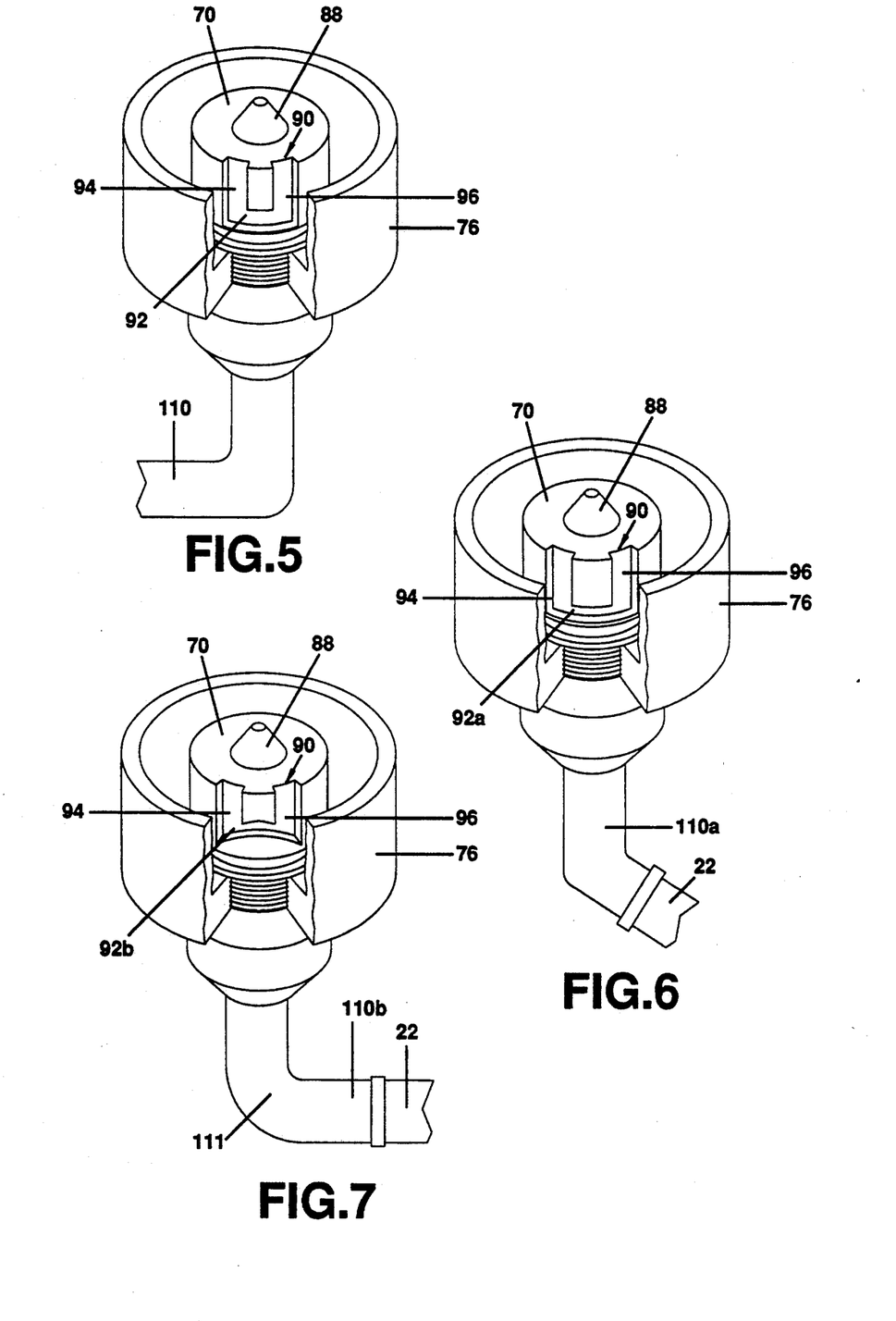
FIG. 5 is a perspective view of the lower connection piece showing the U-shaped slot and moment arm.
FIG. 6 is a view similar to FIG. 5 showing another configuration of the U-shaped slot and moment arm.
FIG. 7 is a view similar to FIG. 5 showing another configuration of the U-shaped slot and moment arm.

Referring to FIG. 5 one embodiment of slot 90 in collar 70 and one embodiment of moment arm 110 is shown. Slot 90 is preferably U-shaped and includes a base, generally horizontal zone 92, adjacent to two vertical, side zones 94 and 96. Side zones 94 and 96 of Slot 90 may be formed with a width twice the diameter of pin 44 to prevent jamming during a pull away. However, the width of side zones 94 and 96 is empirically determined. The side zones 94 and 96 must be wide enough to allow continued rotation attributable to the pull away during ejection. Factors which must be considered in determining the width of side zones 94 and 96 is the length of side zones 94 and 96, the force of spring 100, the system pressure which assists in ejection of pin 44, the pull away speed, etc. The force of spring 100 is great enough to create a clean ejection without the assistance of system pressure (i.e. the pin 44 will eject if the system pressure is zero). Likewise the required force of spring 100 is contingent upon these factors as well as gravity, the mass of the piece ejected, and the position of loading nut 60.

Referring to FIGS. 6 and 7 other embodiments of slot 90 and moment arm 110 are shown. In FIG. 6 the base 92a of slot 90 has a greater arc than shown in FIG. 5. Some filling stands may implement a moment arm 110a angled downward for ease of connection. In FIG. 7, the base 92b of slot 90 is tapered or concave thus requiring a greater latitudinal force to "trigger" the ejection of collar 70 because the pull away occurs in a horizontal plane and therefor the pin 44 must "climb" base 92b against the force of spring 100. Moment arm 110b includes a bend 111 having a greater arc than the previously shown embodiments.

The operation of the invention can be described as follows. Referring to FIGS. 1 and 2 the ejector pull away joint 30 is normally connected. Such connection is made by threading spring loading nut 60 away from the lower end of sleeve 40. Ejector spring 100 is then placed within collar protector 76. Pin 44 must then be aligned with the side or vertical portion 94 or 96 of slot 90 as collar 70 is inserted into bore 45 of conduit 40. When pin 44 reaches the base 92 of slot 90, collar 70 should be rotated so that pin 44 moves within base or horizontal portion 92 and is interposed (visual alignment aids may be provided) between vertical portions 94 and 96 to lock the connection in place and to point moment arm 110 in the desired direction. The U-shaped slot 90 shown in FIG. 7 acts more as a latch or detent. However, the flat base slot (FIGS. 5 and 6) is preferred. O-ring 79 maintains an effective seal during the delivery of high pressure anhydrous ammonia. Since back check valves 50 and 80 protrude slightly beyond the ends of shoulder 46 and collar 70, respectively, when in the closed position (FIG. 3) valves 50 and 80 contact or interface when the connection is made as shown in FIG. 2 to open valves 50 and 80. To complete the connection spring loading nut 60 is threaded against the force of ejector spring 100 to place ejector spring 100 in a "compressed" or "cocked" position.

While the ejector pull away apparatus 30 is connected, an anhydrous ammonia user pulls up to the stand 10 in order to fill their anhydrous ammonia tank 16. The user or operator of the stand 10 connects both inlet and outlet nozzles 18 and 20 to the anhydrous ammonia tank 16. The supply of anhydrous ammonia is opened and the filling procedure is carried out. Flow starts from the top of the drawing in the liquid in-flowing line shown in FIG. 2 and proceeds to bore 48, seat 72, moment arm 110 and into hose 22 (the flow is opposite in the vapor return out flowing line). During normal procedure the anhydrous ammonia tank 16 is filled and nozzles 18 and 20 can be disconnected. However, the present invention comes into use during an accidental pull away while nozzles 18 and 20 are still connected to the anhydrous ammonia tank 16.

During a pull away the user is actually moving in a horizontal, tangential (FIG. 10) or radial (FIG. 11) direction 130 away from the stand 10. This motion places a torque or torsion upon moment arms 110, connections 30 and stand 10. Since stand 10 is rigid or stable, these forces will act primarily against the drag force of spring 100 on collar protector 76. In a preferred embodiment of the invention, the actual direction of the pull away with respect to the connection joint 30 is not as important as the direction 130 of the pull away relative to the direction 120 of the moment arm 110. The axis of moment arm 110 must be perpendicular to the direction 130 of the pull away and such axis cannot be collinear with the axis through connection joint 30. Referring to FIGS. 2 and 3, the direction of the pull away would be perpendicular to the face of the drawing and therefor perpendicular to moment arm 110.

Figure 10:
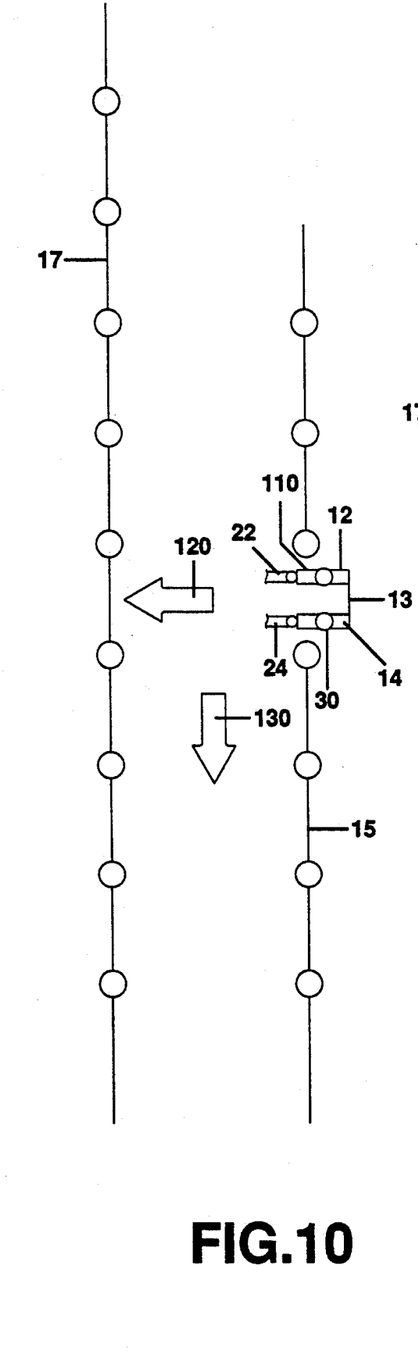
FIG. 10 is a schematic view illustrating the controlled direction of a pull away and moment arm concepts of the invention.
Figure 11:
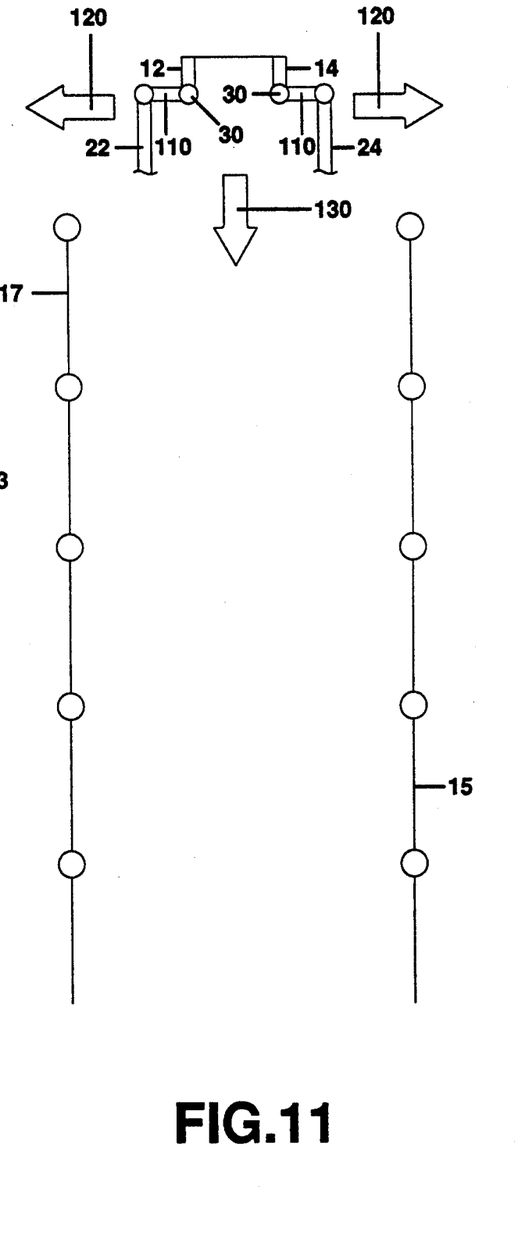
FIG. 11 is a schematic view illustrating the controlled direction of a pull away and moment arm concepts of the invention.

In the embodiment illustrated schematically in FIG. 10 the direction 130 of the pull away 130 occurs at a right angle to the axial direction 120 of the moment arm 110. The moment arm 110 must be rigid. The direction 130 of the pull away 130 can be controlled through the use of barriers 15. The direction 120 of the moment arm 110 can be controlled through the use of visual aids to ensure that the moment arm 110 points in the right direction. Other pull away configurations are possible. For example a back-in fill stand as schematically shown in FIG. 11 can be used with the invention.

Since the moment arm 110 and fill stand 10 (pipes 12, 14 with braces 13) are rigid a pull away occurring in a direction at a right angle to the moment arm 110 will create a latitudinal force causing the moment arm 110 to rotate with respect to the pipes 12 and 14 through connection 30. Collar 70 (the outlet connection functions the same) rotates with respect to conduit 40 once the frictional forces of the ejector spring 100, O-ring 79, and any surfaces touching between conduit 40 and pin 44, and collar 70 and slot 90 are overcome by a resultant torsion or tangential shear force caused by the pull away. Once pin 44 rotates to a side portion 94 or 96 of slot 90, collar 70 will be longitudinally ejected from conduit 40 by ejector spring 100 and the system pressure. Back checks 50 and 80 are instantaneously biased to a closed position after such ejection. If for some reason the system fails to eject and the connection is broken between connection 30 and tank 16, the viscous flow of anhydrous ammonia against disc 34 will thrust disc 34 to neck 38 to close excess flow valve 32.

There are several ways to fine tune the "triggering" of the ejection such as by changing the length of the moment arm 110, the shape of the U-shaped slot 90, the arc of the base 92 of the U-shaped slot 90, and the force of the spring. The system pressure, for example 200 lbs., aids the force of the spring 100 to ensure a clean ejection without the parts "hanging up" during the ejection.

Even if the connection is arranged with collar 70 and collar protector 76 on top, and conduit 40 on the bottom the force of the spring 100 and the system pressure will cause a clean ejection.

After ejection, collar 70, moment arm 110 and hose 22 fall to the ground. collar protector 76 generally protects collar 70 and shrouds back check valve 80 from being dislodged from the closed position when striking the ground. Due to the ejection and resultant instantaneous closing of back checks 50 and 80, collar 70, moment arm 110 and hose 22 traps the system pressure in the hose. This pressure is sufficient to prevent anyone picking up collar 70 from depressing the back check valve 80 and thereby accidentally releasing the trapped media.

Additional emergency valves can be utilized in the invention described above. For example, a rope (not shown) can be attached to the collar and run to a handle which would trip an emergency valve located in line 12 and/or 14 during the event of a pull away. Different arcs and degrees of bends 111 as shown in FIGS. 5–7 may be utilized with the invention. The particular bend 111 utilized normally depends upon the height and design of the filling stand, the height of the tank to be filled and the proximity of the parking position of the tank to the stand. Barriers 15 (FIG. 1) or posts 17 (FIGS. 10–11) must also be utilized within proximity of the stand to direct the person parking the anhydrous ammonia tank to a proper parking position and to limit the directions of pull aways. The fill stand 10, ejector pull away system 30 and moment arm 110 should all be rigid. In this regard all permanent joints are preferably welded.

The preferred embodiment of this invention has been shown and described above. It is to be understood that minor changes in the details, construction and arrangement of the parts may be made without departing from the spirit or scope of the invention as claimed. For example, as shown and described, the U-shaped slot 90 is located on collar 70 and the pin 44 is located on conduit 40. However such arrangement could be reversed.

What is claimed is:

1. An ejector pull away apparatus for use at a filling stand, comprising:
    a flow delivery means;
    a first valve mounted within said flow delivery means;
    a flow connection means for connecting to said flow delivery means;
    a second valve mounted within said flow connection means;
        a means for latching said flow delivery means to said flow connection means for a predetermined amount of latitudinal force between said flow delivery means and said flow connection means and for allowing longitudinal ejection of said flow connection means from said flow delivery means when latitudinal force equals the predetermined amount; and
        a means for ejecting said flow connection means from said flow delivery means when latitudinal force equals the predetermined amount;
        a means for closing said first and said second valves when said flow connection means is ejected; and
        said latching means comprises:
    a pin attached to and radially intending within said flow delivery means;
    said flow connection means defining a U-shaped slot on an outer surface; and
    said U-shaped slot having two side portions and a base portion interposed between the side portions whereby said flow delivery means will be latched to said flow connection means when said pin is within the base portion and said flow connection means will be ejected when said pin is within either of the side portions.

2. The apparatus according to claim 1, further including:
    a loading nut threadable to said flow delivery means; and
    said ejecting means comprising a spring biased between said loading nut and said flow connection means for ejecting said flow connection means via said side portion of said U-shaped slot when a threshold torsion is applied to said flow connection means during a pull away.

3. An ejector pull-away apparatus for use in a filling stand, comprising:
    a flow delivery means;
    a loading nut threadable to said flow delivery means;
    a first valve resiliently mounted within said flow delivery means;
    a pin attached to and radially intending within said flow delivery means;
    a flow connection means having a U-shaped slot on an outer surface;
    said U-shaped slot having two side portions and a base portion interposed between the side portions whereby said flow delivery means will be latched to said flow connection means when said pin is within the base portion and said flow connection means will be ejected when said pin is within either of the side portions;
    a second valve resiliently mounted within said flow connection means and interfacing with said first valve to open said valves when said flow connection means and said flow delivery means are connected;
    a means for maintaining a gastight seal between said flow delivery means and said flow connection means when connected; and
    a spring biased between said loading nut and said flow connection means for ejecting said flow connection means via said side portion of said U-shaped slot when a threshold torsion is applied to said flow connection means during a tank pull-away.

4. The apparatus according to claim 3, wherein said flow connection means further includes a moment arm axially pointed in a direction perpendicular to the direction of the tank pull away.

5. The apparatus according to claim 3, wherein said flow delivery means includes a means for rigidifying said flow delivery means.

6. The apparatus according to claim 3, further including an excess flow valve mounted within and attached to said flow delivery means upstream of said first valve for closing viscous flow during a system failure.

7. The apparatus according to claim 3, further including a means for shrouding said second valve attached to said flow connection means to prevent dislodging of said second valve after ejection of said flow connection means.

8. An ejector pull-away apparatus for use in a filling stand, comprising:
    a rigid and braced pipe;
    a loading nut threadable to said pipe;
    a first valve resiliently mounted within said pipe;
    a pin attached to and radially intending within said pipe;
    a flow connection means having a moment arm and a U-shaped slot on an outer surface;
    said U-shaped slot having two side portions and a base portion interposed between the side portions whereby said pipe will be latched to said flow connection means when said pin is within the base portion and said flow connection means will be ejected when said pin is within either of the side portions;
    a second valve resiliently mounted within said flow connection means and interfacing with said first valve to open said valves when said flow connection means and said pipe are connected;
    a means for maintaining a gastight seal between said pipe and said flow connection means when connected;
    a collar protector attached around said flow connection means to prevent dislodging of said second valve after ejection of said flow connection means;
    said moment arm pointed axially in a direction perpendicular to the direction of a tank pull away; and
    a spring biased between said loading nut and said flow connection means for ejecting said flow connection means via said side portion of said U-shaped slot when a threshold torsion is applied to said moment arm during the tank pull-away.

* * * * *